Aug. 24, 1926.
A. E. VOSBURG ET AL
1,597,126
BORING BAR
Filed March 17, 1921
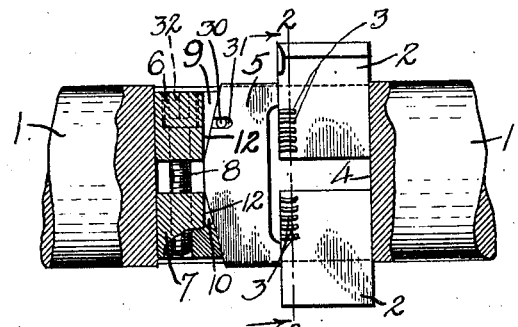
Fig. 1.
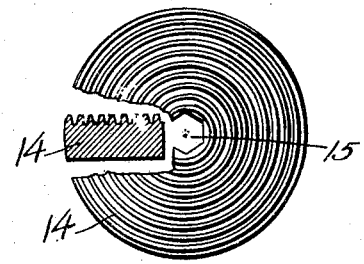
Fig. 4.
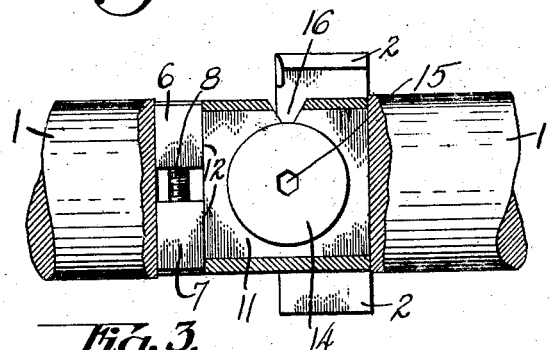
Fig. 3.
Fig. 5.
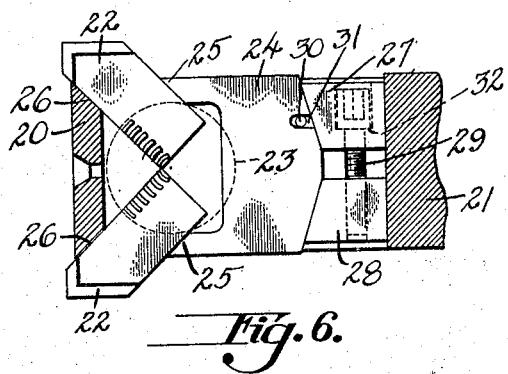
Fig. 6.
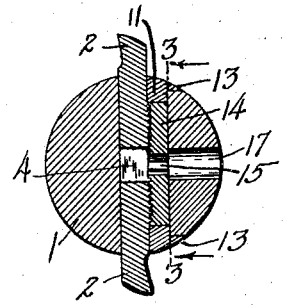
Fig. 2.
INVENTORS
ALAN E. VOSBURG.
ROBERT B. WHITNEY.
BY ATTORNEY Patented Aug. 24, 1926.

1,597,126

UNITED STATES PATENT OFFICE.

ALAN E. VOSBURG AND ROBERT B. WHITNEY, OF DETROIT, MICHIGAN, ASSIGNORS TO ARTHUR V. HANNIFIN, OF CHICAGO, ILLINOIS.

BORING BAR.

Application filed March 17, 1921. Serial No. 453,190.

This invention relates to boring bars and the object of the invention is to provide a boring bar in which the cutting tools may be adjusted radially to bore apertures of various sizes. Another object of the invention is to provide a boring bar in which the cutting tools are locked in position at any variation and may be wedged in position to prevent chattering thereof. A further object of the invention is to provide a boring bar in which a spirally toothed disc is rotatably mounted, rotation of the said disc in one direction or the other moving the cutting tools apart or drawing the same together. A still further object of the invention is to provide a boring bar provided with a disc rotatable to vary the position of the cutting tools, the disc being provided with indications on the peripheral face thereof exposed to view through a slot and indicating the various adjustments of the cutting tools. These objects and the several novel features of the invention are hereinafter more fully described and claimed and the preferred form of construction by which these objects are obtained is shown in the accompanying drawings in which—

Fig. 1 is a section through a boring bar embodying our invention.

Fig. 2 is a section taken on line 2—2 of Fig. 1.

Fig. 3 is a section taken on line 3—3 of Fig. 2.

Fig. 4 is a plan view of the adjusting dial showing the spiral tooth thereon.

Fig. 5 is an edge view thereof.

Fig. 6 shows an alternative form of construction.

The device as shown in Fig. 1 consists of a bar or shaft 1 and a slot is cut through this shaft in which the different parts are positioned as shown in Figs. 1 and 2. Mounted in this slot is a pair of cutting tools 2 which are provided with curved teeth 3 thereon as shown in Figs. 1 and 2. These tools 2 abut against the lower edge 4 of the slot and a bridge member or yoke 5 is provided which is positioned in the slot and provided with feet adapted to engage the edge of the cutting tools 2, as shown in Fig. 1. Also provided in this slot is a pair of wedge members 6 and 7 connected together by a screw 8, the wedge members 6 and 7 being provided with angular portions 9 and 10 adapted to engage the outer angular faces of the bridge member 5. A pin 30, as shown in Figs. 1 and 4, is provided which extends into the slot from one side of the shaft 1 and engages in the slot 31 in the yoke 5. By this means the yoke 5 is held in place and due to the angular portions 9 and 10 of the wedge blocks 6 and 7 engaging the angular faces of the yoke 5, the said wedge blocks are held in position in the slot. A plate 11 is provided, as shown in Fig. 3, which is also positioned in the slot and abuts the end 4 of the slot and the shoulders 12 of the wedge blocks 6. This plate 11, as shown more particularly in Fig. 2, is provided with flanges 13 on the two sides thereof adapted to fit over the adjacent edge of the shaft 1 which is cut out for this purpose as shown and thus the plate 11 which is square as shown in Fig. 3, is held in position at both ends in the slot and is also held in position at both sides by the flanges 13. Carried in an aperture provided therefor in the plate 11 is a disc 14 which is provided with a hexagonal aperture 15 therein in which a wrench may be inserted. This disc 14, as shown in Fig. 4, is provided with a spiral tooth or groove, the disc being also shown in section in Fig. 4. This disc is placed with the teeth 3 of the cutting tools 2 engaging in the spiral groove and it can thus be seen that by rotation of the disc 14 the tools are either moved apart or drawn together. The plate 11 is notched at 16 to provide an aperture in which the periphery of the disc 14 is exposed to view. As shown in Fig. 2 this disc is preferably provided with a series of indications thereon, the indications in this case being intended to indicate inches in thousandths. As shown in Fig. 2, an aperture 17 is provided in the shaft or bar 1 which leads to the hexagonal aperture 15 in the disc 14 and allows the insertion of a wrench for turning the disc. It can thus be seen that when the parts are assembled as shown, rotation of the disc 14 will cause the teeth 3 to travel through the spiral groove and thus move the tools to a greater or less distance apart. As the disc 14 is rotated the different divisions on the periphery thereof are brought to view in the notch 16 so that the operator may be informed at all times of the distance between the cutting edges of the tools which is the diameter of the aperture which the tool will bore. The divisions are placed on the disc 14 to indicate in a complete rotation thereof the relative amount of travel of the cutting tools to the thousandth part of an inch. The diameter of the smallest hole possible to be cut by the cutting tools being known it is only necessary to add the reading on the disc thereto to obtain the correct diameter. Should the disc be turned slightly more than three times to set the cutting tools in the position shown in Fig. 2, then three times the amount of tools are moved upon each rotation of the disc must be added to the smallest possible diameter plus the present reading of the disc which will give the correct cutting diameter of the tools.

In Fig. 6 I have shown an alternative form of the device for boring blind holes or recesses in which the cutting tools extend from the boring bar at an angle one to the other. In this case the slot extends well down toward the end 20 of the boring bar 21. The tools 22 in this instance are set at an angle one to the other and are provided with teeth meshing with the teeth of a disc indicated by dotted lines 23 in Fig. 6. A bridge or yoke 24 is provided having angularly faced feet 25 engaging the edge of the cutting tools 22. The end 20 of the boring bar is provided with angular faces 26 against which the cutting tools also engage. A pair of wedge blocks 27 and 28 are provided engaging a pair of angular faces on the bridge or yoke 24, the wedge blocks being held together by a screw 29.

The operation of this device is substantially the same as that shown in Fig. 1. The screws 8 and 29 are each provided with a head 32 having a hexagonal aperture therein for the insertion of a wrench and these screws are first loosened to allow the parts to be loosely positioned in the slot of the boring bar. Upon loosening the screw 29 the disc 23 is turned until the tools are properly adjusted at which time by turning the screw 29 the wedge blocks 27 and 28 are drawn together thus forcing the yoke 24 into binding engagement with the cutting tools 22 thereby binding the cutting tools between the angular faces 25 of the yoke 24 and the angular faces 26 of the shaft end 20. The device shown in Fig. 1 operates in a similar manner except that upon drawing the wedge blocks together the tools 2 are bound against the end 4 of the slot by the bridge or yoke member 5. As shown in Figs. 1 and 2 the wedge members 6 and 7 are notched at one side to receive the plate 11 so that the wedge blocks 6 and 7 may be moved longitudinally of the screw 8 without interfering with the plate 11, the wedge portions 9 and 10 acting on the yoke or bridge 5 entirely beneath the plate 11.

From the foregoing description it becomes evident that the device is very simple and efficient in operation, of comparatively low manufacturing cost, in which the cutting tools are at all times held with sufficient rigidity to prevent chattering and provides a device in which the diameter of the cutting tools is indicated and which accomplishes the objects desired.

Having thus fully described my invention, its utility and mode of operation, what we claim and desire to secure by Letters Patent of the United States is—

1. The combination with a laterally apertured bar of a pair of cutters mounted therein and extending outwardly therefrom on opposite sides of the bar, the sides of the cutters within the slot having projecting teeth, a rotatable disc mounted for rotation on an axis at right angles to the axis of the boring bar, said disc having a spirally grooved side with which the teeth of the said cutters mesh, rotation of the disc in one direction causing the cutters to be moved outwardly and rotation in the other direction causing the cutters to be moved inwardly of the slot, the said disc having a graduated periphery determining the extent of movement of the cutters by rotation of the disc.

2. The combination with a laterally apertured bar of a pair of cutters mounted therein and extending outwardly therefrom in opposite directions, said cutters each having teeth formed therein, an adjusting device comprising a spirally grooved disc with which the teeth of the cutters mesh, said disc being located in the said aperture in the bar with the axis of rotation extending at a right angle to the slot, a retainer for the disc, said retainer having a cut out portion exposing the periphery of the disc to view, the periphery of the disc being graduated whereby the extent of adjustment may be determined.

3. The combination with a laterally apertured bar of a pair of cutters mounted therein and extending outwardly therefrom in opposite directions, said cutters each having teeth formed therein, an adjusting device including a spirally grooved member engaged by the teeth of the cutters and mounted for rotation on an axis at right angles to the axis of the boring bar, and means for binding the cutters in adjusted position.

4. In a boring bar, a shaft provided with a slot, a pair of wedge blocks mounted in the slot, means for drawing the wedge blocks together and moving the same apart, a pair of cutting tools mounted in the said slot, a yoke interposed between the cutting tools and wedge blocks, a series of teeth on each cutting tool, a plate mounted in the said slot and provided with a V shaped notch in the edge thereof, and a spirally toothed disc rotatably mounted in the said plates and meshing with the said teeth on the cutting tools.

5. The combination with a laterally apertured bar, of a pair of cutters mounted therein and extending outwardly therefrom on opposite sides of the bar, the sides of the cutters within the slot having projecting teeth, and a rotatable disc mounted for rotation on an axis at right angles to the axis of the boring bar, said disc having a spirally grooved side with which the teeth of said cutters mesh, rotation of the disc in one direction causing the cutters to be moved outwardly and rotation in the other direction causing the cutters to be moved inwardly of the slot.

6. The combination with a laterally apertured bar, of a pair of cutters mounted therein and extending outwardly therefrom in opposite directions, said cutters each having teeth formed therein, and an adjusting device including a spirally grooved member engaged by the teeth of the cutters and mounted for rotation on an axis at right angles to the axis of the boring bar.

7. In a boring bar a shaft, cutting tools adjustably mounted therein, and means for adjusting said tools comprising a disc mounted for rotation about an axis at right angles to the axis of rotation of the shaft, and spiral scroll connections from said disc to the tools, whereby rotation of the disc adjusts the positions of the tools.

8. In a device of the kind described, a member having an opening therein, oppositely disposed cutters arranged within said opening and having their outer or cutting edges projecting from said member, the inner portions of said cutters being provided with scroll teeth, said member having a second opening communicating with the first named opening, an adjusting scroll positioned in said second opening and engaging the scroll teeth of the cutters to move said cutters in and out, a locking block, and means including a screw for forcing said locking block against the cutters.

9. In a device of the kind described, a member having an opening therein, oppositely disposed cutters arranged within said opening and having the outer or cutting edges projecting from said member, the inner portions of said cutters being provided with scroll teeth, said member having a second opening communicating with the first named opening, an adjusting scroll positioned in said second opening and engaging the scroll teeth of the cutters to move said cutters in and out, a locking block, oppositely disposed wedges, and a screw for actuating said wedges for forcing said locking block against the cutters.

In testimony whereof, we sign this specification.

ALAN E. VOSBURG.
ROBERT B. WHITNEY.